US010710547B2

(12) United States Patent
Tsalenko

(10) Patent No.: US 10,710,547 B2
(45) Date of Patent: Jul. 14, 2020

(54) SEAT BELT ADJUSTMENT RELEASE MECHANISM

(71) Applicant: NYX, Inc., Livonia, MI (US)

(72) Inventor: Yuriy Tsalenko, West Bloomfield, MI (US)

(73) Assignee: NYX, INC., Livonia, MI (US)

( * ) Notice: Subject to any disclaimer, the term of this patent is extended or adjusted under 35 U.S.C. 154(b) by 157 days.

(21) Appl. No.: 15/888,746

(22) Filed: Feb. 5, 2018

(65) Prior Publication Data
US 2018/0222438 A1 Aug. 9, 2018

Related U.S. Application Data

(60) Provisional application No. 62/455,168, filed on Feb. 6, 2017.

(51) Int. Cl.
B60R 22/20 (2006.01)
B60R 22/24 (2006.01)
B60R 22/18 (2006.01)

(52) U.S. Cl.
CPC ............ *B60R 22/203* (2013.01); *B60R 22/24* (2013.01); *B60R 2022/1818* (2013.01)

(58) Field of Classification Search
CPC ... B60R 22/203; B60R 22/202; B60R 22/201; B60R 22/20; B60R 22/24; B60R 22/205; B60R 2022/1818
USPC ....................................... 280/801.2
See application file for complete search history.

(56) References Cited

FOREIGN PATENT DOCUMENTS

JP 2012136112 A * 7/2012

* cited by examiner

Primary Examiner — Keith J Frisby
(74) Attorney, Agent, or Firm — Carlson, Gaskey & Olds, P.C.

(57) ABSTRACT

A seat belt adjustment release mechanism includes a carrier and a guide piece that is vertically slidable on the carrier. The guide piece includes an aperture configured to receive a seat belt there through and a spring-loaded button anchored on a pivot. The spring-loaded button, when pressed, is rotatable about the pivot between a home position and a depressed position for actuating a seat belt guide release lever.

10 Claims, 2 Drawing Sheets

SEAT BELT ADJUSTMENT RELEASE MECHANISM

CROSS REFERENCE TO RELATED APPLICATION

This application claims benefit of U.S. Provisional Application No. 62/455,168 filed Feb. 6, 2017.

BACKGROUND

A three-point seat belt of a vehicle is usually supported at shoulder height by a guide loop. The seat belt is coupled with a retractor and a lap belt portion with a buckle. The guide loop may be mounted on the vehicle seat or attached to an adjacent vehicle pillar. In some vehicles the guide loop is on a height adjuster mounted to the pillar. The height adjuster may include a carrier that is manually moveable up and down by the seat occupant. The carrier may include a locking mechanism that secures the carrier at the desired height as chosen by the seat occupant. The carrier and locking mechanism are usually within the vehicle interior trim and there is an actuation mechanism in the trim to enable the seat occupant to release the locking mechanism to adjust the height.

SUMMARY

A seat belt adjustment release mechanism according to an example of the present disclosure includes a carrier and a guide piece that is vertically slidable on the carrier. The guide piece has an aperture configured to receive a seat belt there through and a spring-loaded button anchored on a pivot. The spring-loaded button, when pressed, is rotatable about the pivot between a home position and a depressed position for actuating a seat belt guide release lever.

A seat belt adjustment release mechanism according to an example of the present disclosure includes a carrier and a guide piece that is vertically slidable on the carrier. The guide piece has an aperture configured to receive a seat belt there through and a spring-loaded button that, when pressed, moves between a home position and a depressed position for actuating a seat belt guide release lever. The spring-loaded button has a contact surface for engaging the release lever. The contact surface is sloped relative to the vertical direction.

A seat belt adjustment release mechanism according to an example of the present disclosure includes a seat belt guide that has a seat belt guide release lever moveable upon actuation of the seat belt guide release lever, a carrier, and a guide piece that is vertically slidable on the carrier. The guide piece has an aperture configured to receive a seat belt there through and a spring-loaded button anchored on a pivot. The spring-loaded button, when pressed, is rotatable about the pivot between a home position and a depressed position actuating the seat belt guide release lever. The spring-loaded button has a contact surface engaging the seat belt guide release lever in at least the depressed position. The contact surface is sloped relative to the vertical direction

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
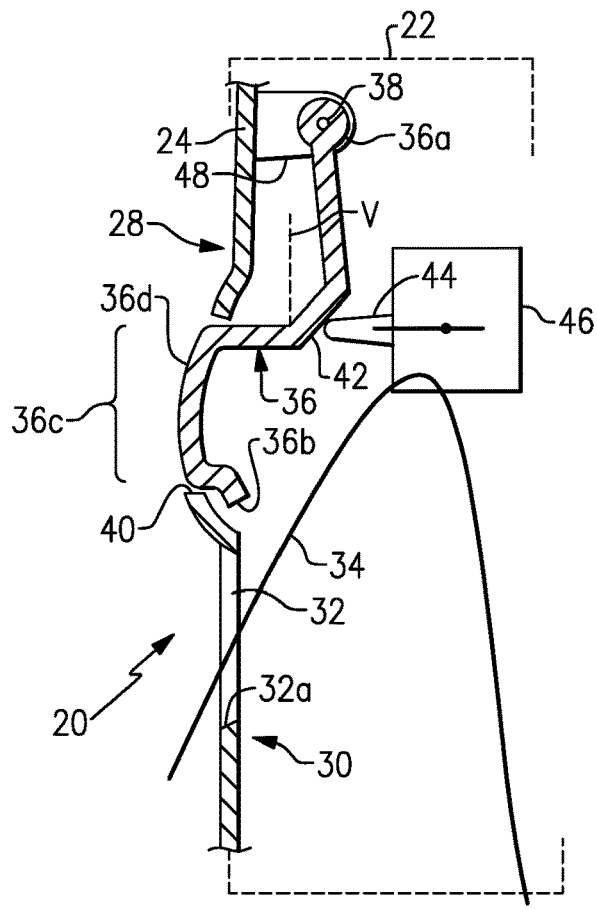
FIG. 1 illustrates a seat belt adjustment release mechanism in a home position.

FIG. 1 schematically illustrates a sectioned view of a seat belt adjustment release mechanism 20 ("adjustment release mechanism 20"). As will be appreciated from the examples herein, the adjustment release mechanism 20 can be ergonomic, compact, and easily actuated by a user.

The adjustment release mechanism 20 includes a carrier 22 and a guide piece 24 that is vertically slidable on the carrier 22, as represented by arrows 26. The guide piece 24 may slide on rails, sliders, or the like, for example. Although not limited, the carrier 22 and the guide piece 24 may be formed from molded plastic. The adjustment release mechanism 20 generally defines an exposed, first side 28 and an unexposed, second side 30. The exposed first side 28 faces the user, which is typically an occupant of a seat in a vehicle. The first side 28 may thus have an aesthetic finish.

The guide piece 24 generally includes an aperture 32 that is configured to receive a seat belt 34 there through. As an example, the aperture 32 is horizontally elongated to a dimension that is greater than the width of the seat belt 34 and has relatively smooth, rounded edges. In particular, a bottom edge 32a of the aperture 32 is rounded, to guide the seat belt 34 and avoid damaging the seat belt 34.

The guide piece 24 also includes a spring-loaded button 36. The button 36 has a first end 36a that is anchored on a pivot 38 and a second, free end 36b that is not affixed. An interface portion 36c of the button 36 extends through a button aperture 40 in the guide piece 24 that is vertically above the aperture 32. The interface portion 36c includes a user-interface surface 36d, which is exposed to the user and is the portion of the button 36 that the user contacts for actuation.

In this example, vertically intermediate the ends 36a/36b the button 36 includes a contact surface 42. Here, the contact surface 42 is sloped relative to the vertical direction represented at V. For instance, the contact surface 42 is sloped at an angle of 45° relative to the vertical direction V.

The contact surface 42 is in contact with a seat belt guide release lever 44. The release lever 44 is part of a seat belt guide adjustment release mechanism 46 through which the seat belt 34 is looped. The seat belt guide adjustment release mechanism 46 is moveable vertically up and down upon actuation of the release lever 44, which when actuated unlocks the seat belt guide 46 for movement. The 45° slope of the contact surface 42 of the adjustment release mechanism 20 allows the exertion of the same force in the desired direction of the adjuster mechanism movement as is applied in the direction normal to it.

Figure 2:
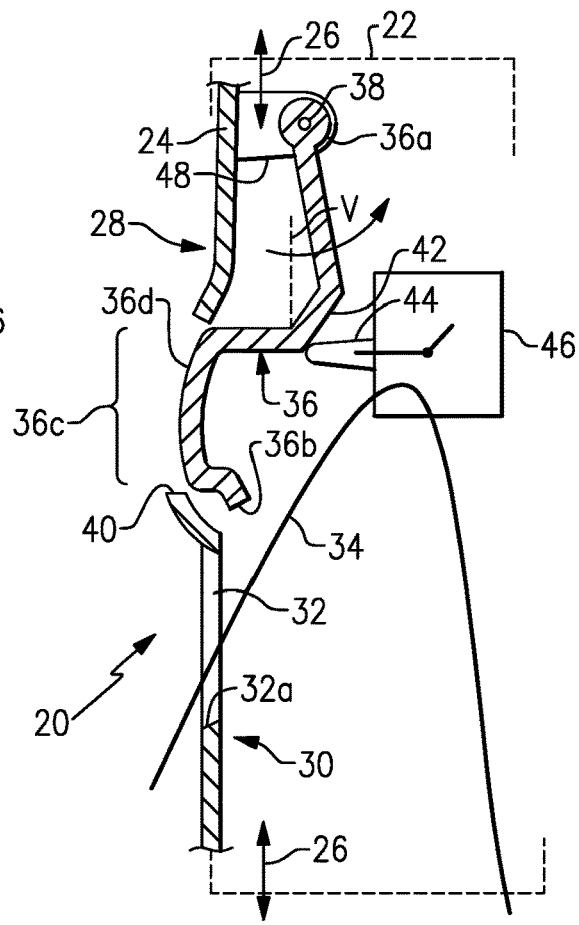
FIG. 2 illustrates the seat belt adjustment release mechanism in a depressed position.

A spring 48 biases the button 36 to a home position, which is shown in FIG. 1. The button 36, when pressed by a user, is rotatable about the pivot 38 between the home position and a depressed position, which is shown in FIG. 2. Upon release of the button 36, the spring 48 returns the button 36 to the home position.

Actuation to depress the button 36 moves the contact surface 42 against the release lever 44, causing the release lever 44 to slide or move down the slope of the contact surface 42. The downward movement of the release lever 44 releases (i.e., unlocks) the seat belt guide 46 from a locked state such that the seat belt guide 46 and guide piece 24 can move up and down in unison to adjust the vertical height of the seat belt 34 and the aperture 32 through which it extends. Once the user releases the button 36, the release lever 44 returns to a locked state in which the seat belt guide 46 is locked in place.

The rotational movement of the button 36 to actuate the release lever 44 permits the user to actuate the button 36 and release the lever 44 with a push of one finger, in a horizontal or near horizontal actuation direction. Thus, a thumb-forefinger vertical pinching motion for actuation is avoided, making the adjustment release mechanism 20 easy to use and ergonomic. Additionally, the design is relatively compact and thus permits greater freedom in the aesthetic design for a sleek vehicle interior.

Figure 3:
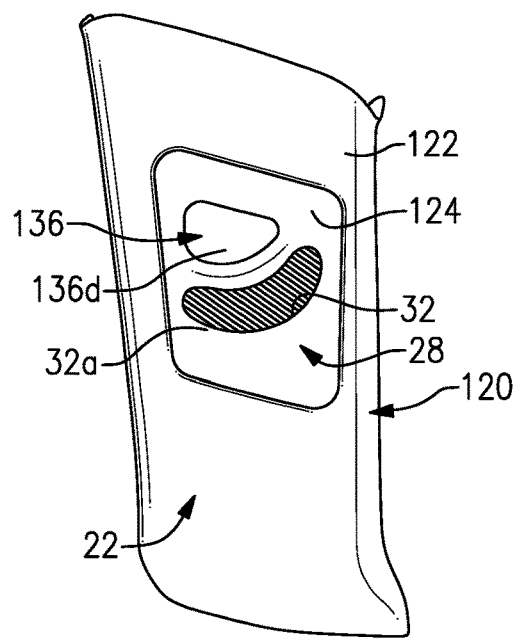
FIG. 3 illustrates an exposed side of another example seat belt adjustment release mechanism.
Figure 4:
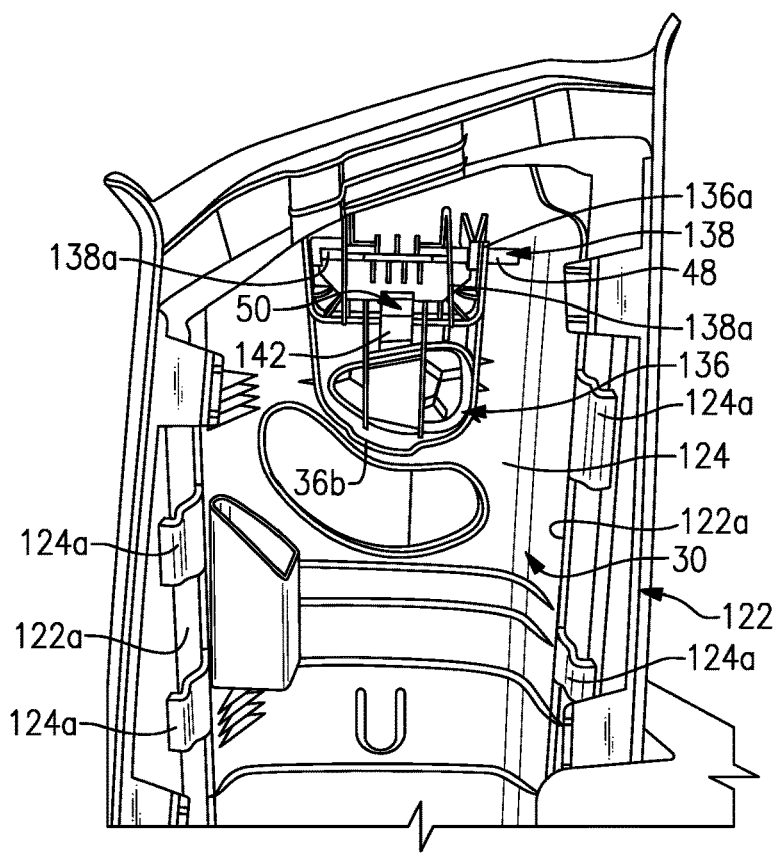
FIG. 4 illustrates an unexposed side of the seat belt adjustment release mechanism of FIG. 3.

FIG. 3 illustrates the exposed side 28 of another adjustment release mechanism 120, while FIG. 4 illustrates the unexposed side 30. In this disclosure, like reference numerals designate like elements where appropriate and reference numerals with the addition of one-hundred or multiples thereof designate modified elements that are understood to incorporate the same features and benefits of the corresponding elements. In this example, the carrier 122 has vertical rails 122a. For instance, there are two spaced-apart parallel vertical rails 122a for carrying the guide piece 124. The guide piece 124 has sliders 124a mounted on the vertical rails 122a. The sliders 124a hold the guide piece 124 on the carrier 122 but permit the guide piece 124 to be slid up and down in the carrier 122 as the seat belt guide 46 (not shown) is moved.

Figure 5:
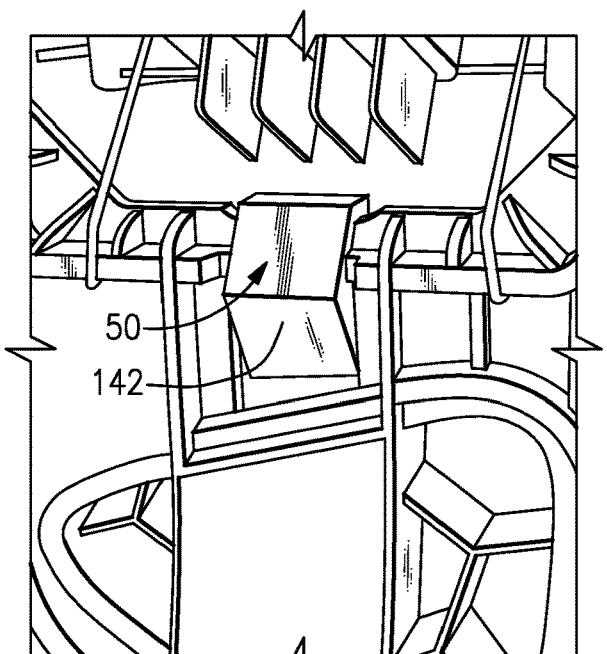
FIG. 5 illustrates a magnified view of a portion of the seat belt adjustment release mechanism of FIG. 4.

The first end 136a of the button 136 is anchored on pivot 138. In this example, the pivot 138 includes one or more pins 138a, which may be integral with the button 136 or guide piece 124. The button 136 also has a contact surface 142 that is on a friction element 50, which is also shown in a magnified view in FIG. 5. In this example, the friction element 50 is mechanically secured on the button 136, such as by a snap-fit. The friction element 50 is formed of a low friction material, to ease movement against the release lever 44 and reduce wear. As an example, a low friction material as used herein refers to a material that has a lower coefficient of friction that the material from which the button 136 is formed from. For instance, the button 136 may be molded from a first polymer-based composition and the friction element 50 may be formed of a second polymer-based material that has a lower coefficient of friction than the first polymer-based material. In one example alternative, the friction element 50 may be coated on the button 136.

Also, as shown in FIG. 3, the user interface surface 136d in this example is sloped relative to the vertical direction. The slope permits the use to impart motion in the horizontal direction to actuate the release lever 44 and also in the vertical direction to adjust vertical height.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A seat belt adjustment release mechanism comprising:
   a seat belt guide having a seat belt guide release lever, the seat belt guide being moveable upon actuation of the seat belt guide release lever;
   a carrier; and
   a guide piece that is vertically slidable on the carrier, the guide piece including an aperture configured to receive a seat belt there through and a spring-loaded button anchored on a pivot, the spring-loaded button, when pressed, rotatable about the pivot between a home position and a depressed position actuating the seat belt guide release lever, the spring-loaded button having a contact surface engaging the seat belt guide release lever in at least the depressed position, the contact surface being sloped relative to the vertical direction.

2. The mechanism as recited in claim 1, wherein the spring-loaded button includes a user-interface surface that is sloped relative to the vertical direction.

3. The mechanism as recited in claim 1, wherein the pivot includes one or more pins.

4. The mechanism as recited in claim 1, wherein the carrier has vertical rails and the guide piece has sliders mounted on the vertical rails.

5. The mechanism as recited in a claim 1, wherein the spring-loaded button is vertically above the aperture.

6. The mechanism as recited in claim 1, wherein the contact surface is sloped at an angle of 45° relative to the vertical direction.

7. The mechanism as recited in claim 1, wherein the spring-loaded button has a first end attached to the pivot and a second end that is free, and the contact surface is intermediate the first and second ends.

8. The mechanism as recited in claim 1, wherein the contact surface is on a friction element mechanically secured on the spring-loaded button.

9. The mechanism as recited in claim 1, wherein the contact surface includes a low-friction material.

10. The mechanism as recited in claim 9, wherein the spring-loaded button has a first end attached to the pivot and a second end that is free, and the first end is vertically above the second end.

* * * * *